United States Patent
Gueta et al.

(10) Patent No.: US 11,252,244 B1
(45) Date of Patent: Feb. 15, 2022

(54) SYSTEM AND METHOD FOR WEB-SESSION RECORDING

(71) Applicant: GLASSBOX LTD., Petah Tikva (IL)

(72) Inventors: Yaron Gueta, Hod Hasharon (IL); Shachar Ofek, Ra'anana (IL)

(73) Assignee: GLASSBOX LTD., Petah Tikva (IL)

( * ) Notice: Subject to any disclaimer, the term of this patent is extended or adjusted under 35 U.S.C. 154(b) by 0 days.

(21) Appl. No.: 17/086,503

(22) Filed: Nov. 2, 2020

(51) Int. Cl.
- *G06F 15/173* (2006.01)
- *H04L 29/08* (2006.01)
- *H04L 29/06* (2006.01)

(52) U.S. Cl.
CPC .......... *H04L 67/22* (2013.01); *H04L 63/1441* (2013.01); *H04L 67/146* (2013.01)

(58) Field of Classification Search
CPC ...... H04L 67/22; H04L 67/14; H04L 63/1441
See application file for complete search history.

(56) References Cited

U.S. PATENT DOCUMENTS

| | | | |
|---|---|---|---|
| 9,338,255 B1 | 5/2016 | Doe et al. | |
| 10,802,847 B1 * | 10/2020 | Mahapatra | G06F 11/0793 |
| 2009/0063968 A1 | 3/2009 | Wenig et al. | |
| 2012/0102101 A1 | 4/2012 | Wenig et al. | |
| 2012/0173966 A1 | 7/2012 | Powell et al. | |
| 2017/0019489 A1 | 1/2017 | Churchill | |
| 2017/0323026 A1 | 11/2017 | Le Bras et al. | |
| 2019/0138711 A1 * | 5/2019 | Yaffe | G06F 16/2379 |
| 2019/0243858 A1 * | 8/2019 | Gueta | H04L 67/142 |

FOREIGN PATENT DOCUMENTS

WO  WO2003065232  8/2003

* cited by examiner

*Primary Examiner* — Yves Dalencourt

(57) ABSTRACT

A web-session recording system comprising at least one processing circuitry configured to: provide instructions, executable as part of execution of a webpage executable by a web browser executing on a user device, the instructions designed to cause recording of a web-session, wherein executing the instructions as part of the webpage on the user device results in sending an execution indication, indicating of successful execution of the instructions, from the user device to the web-session recording system; upon the web-session recording system not receiving the execution indication after an attempt to execute the instructions on the user device, record (a) requests sent from the user device associated with the web-session to the web-session recording system, and (b) responses sent from the web-session recording system to the user device associated with the web-session.

21 Claims, 2 Drawing Sheets

SYSTEM AND METHOD FOR WEB-SESSION RECORDING

TECHNICAL FIELD

The invention relates to a system and method for web-session recording.

BACKGROUND

Many solutions exist nowadays for recording and replaying web-sessions, inter alia for enabling website owners to obtain various insights on the users' interaction with their website. These current solutions rely on code, that is executed as part of a webpage by a web browser on a user device, in order to record the web-session.

One of the challenges of current web-session recording solutions is that they are dependent on executing instructions (for example: JavaScript instructions) on the user device. In some cases, the user device is equipped with script blocking software that blocks the instructions from executing, thus disabling the ability of the current web-session recording solutions to record the web-session. In some cases, a security system (for example: a firewall) removes the instructions from the webpage before the webpage is executed by the web browser on the user device, thus disabling the ability of the current web-session recording solutions to record the web-session. In other cases, the attempt to execute the instructions is ignored by an agent selectively executing one or more parts of the webpage (for example: the agent is an Internet bot that is crawling the webpage), thus disabling the ability of the current web-session recording solutions to record the web-session.

There is thus a need in the art for a new method and system for web-session recording.

References considered to be relevant as background to the presently disclosed subject matter are listed below. Acknowledgement of the references herein is not to be inferred as meaning that these are in any way relevant to the patentability of the presently disclosed subject matter.

US Patent application No. 2012/0102101 (Wenig et al.) published on Apr. 26, 2012, discloses a network data associated with a network session is captured at a first location. The network data includes, but is not limited to, web page data transmitted over a network between a web-server and a user terminal. User interface events associated with the same network session are separately captured at a second user terminal location. The user interface events include, but are not limited to, user inputs for interacting with the web page data. Both the captured network data and the separately captured user interface events are then used for analyzing the network session.

US Patent application No. 2009/0063968 (Wenig et al.) published on Mar. 5, 2009, discloses a user interface event monitor captures user interface events executed by a client during a network session. A network session monitor captures network data exchanged between the client and a web application during the network session. A replay device identifies control events in the network session that require execution before replaying associated user interface events. Replay of the user interface events are delayed by the replay device until the associated control events have been fully executed.

U.S. Pat. No. 9,338,255 (Doe et al.) published on May 10, 2016, discloses in one embodiment, a method includes operating at least one distributed software application. The method further includes receiving a web request from an end-user information handling system in connection with the at least one distributed software application. Further, the method includes generating a transaction identifier for the transaction. Moreover, the method includes processing the transaction. The processing includes generating backend-performance data indexed by the transaction identifier. Additionally, the method includes injecting the transaction identifier into a web response to the web request. Also, the method includes transmitting the web response to the end-user information handling system along a transmission path. In addition, the method includes, at a node along the transmission path, passively observing the response and generating end-user experience data therefrom.

US Patent application No. 2017/0323026 (Le Bras et al.) published on Nov. 9, 2017, discloses generating replay of a webpage is provided. In response to determining that a document object model (DOM) replay of the webpage is a differential DOM replay, a base DOM of the webpage, base DOM differentials of the webpage, and user interactions with the webpage are retrieved. The base DOM of the webpage is patched with the base DOM differentials of the webpage to generate a patched DOM corresponding to the webpage. The user interactions with the webpage are overlaid on the patched DOM to generate the replay of the webpage.

US Patent application No. 2012/0173966 (Powell et al.) published on Jul. 5, 2012, discloses a monitoring system intelligently captures Document Object Model (DOM) events. The DOM events may provide state information that may not usually be captured during a web session. To reduce processing bandwidth, content identifiers may be used to represent some DOM events. Checkpoints may be identified during the web session and a current state of the webpage may be captured to provide replay synchronization. Different data may be captured based on a sequence and timing of the DOM events during the original web session. Data exchanged with third party websites also may be selectively captured to provide a more through simulation of the original web session.

World Intellectual Property Organization (WIPO) Patent application No. 2003/065232 (House et al.) published on Aug. 7, 2003, discloses data exchanged between at least one server (100) and at least one user (120) is captured, selectively recorded, and replayed. The exchanged data is intercepted in a capturing module that operates independently from the server (100) and the user (120). A copy of the intercepted data is stored in a database (110). The intercepting and storing are performed transparently to the user. The captured data is retrieved and a determination is made whether the retrieved data satisfies predefined rules. Data that satisfies the predefined rules is selected, and the selected data is recorded. The captured data is collected during a given time period, and a session of interactions between the server (100) and the user (120) is assembled in the order in which they occurred. Then, the session is replayed.

US Patent application No. 2017/0019489 (Churchill) published on Jan. 19, 2017, discloses methods for recording a session of user interaction with a website for subsequent replay comprise executing on a computer having a processor and memory the steps of receiving in the memory a webpage from the website, creating a queue of items with the processor, and storing the queue in the memory. Each item corresponds to an element of the webpage that is to be monitored for changes and comprises data entries corresponding to the current state of each of a plurality of properties for the respective element. A method of recreating a session of user interaction with a website is also provided, which involves processing batches of data generated as a result of recording a session of user interaction with a web site.

General Description

In accordance with a first aspect of the presently disclosed subject matter, there is provided a web-session recording system comprising at least one processing circuitry configured to: provide instructions, executable as part of execution of a webpage executable by a web browser executing on a user device, the instructions designed to cause recording of a web-session, wherein executing the instructions as part of the webpage on the user device results in sending an execution indication, indicating of successful execution of the instructions, from the user device to the web-session recording system; upon the web-session recording system not receiving the execution indication after an attempt to execute the instructions on the user device, record (a) requests sent from the user device associated with the web-session to the web-session recording system, and (b) responses sent from the web-session recording system to the user device associated with the web-session.

In some cases, webpage is provided by a web-server.

In some cases, the execution indication is attached to at least one of the requests.

In some cases, the execution indication is a session-recording Identification Number (ID), associated with the web-session.

In some cases, the attempt to execute the instructions is blocked by a script blocking software installed on the user device.

In some cases, the attempt to execute the instructions is blocked by a security system removing the instructions from the webpage before the webpage is executed on the user device.

In some cases, the attempt to execute the instructions is ignored by an agent selectively executing one or more parts of the webpage.

In some cases, the instructions are JavaScript instructions.

In some cases, the processing circuitry if further configured to assign a session-recording ID to the respective web-session.

In some cases, the session-recording ID is unique.

In accordance with a second aspect of the presently disclosed subject matter, there is provided a web-session recording method comprising: providing, by a processing circuitry, instructions, executable as part of execution of a webpage executable by a web browser executing on a user device, the instructions designed to cause recording of a web-session, wherein executing the instructions as part of the webpage on the user device results in sending an execution indication, indicating of successful execution of the instructions, from the user device to the web-session recording system; upon the web-session recording system not receiving the execution indication after an attempt to execute the instructions on the user device, recording, by the processing circuitry, (a) requests sent from the user device associated with the web-session to the web-session recording system, and (b) responses sent from the web-session recording system to the user device associated with the web-session.

In some cases, the webpage is provided by a web-server.

In some cases, the execution indication is attached to at least one of the requests.

In some cases, the execution indication is a session-recording Identification Number (ID), associated with the web-session.

In some cases, the attempt to execute the instructions is blocked by a script blocking software installed on the user device.

In some cases, the attempt to execute the instructions is blocked by a security system removing the instructions from the webpage before the webpage is executed on the user device.

In some cases, the attempt to execute the instructions is ignored by an agent selectively executing one or more parts of the webpage.

In some cases, the instructions are JavaScript instructions.

In some cases, the processing circuitry if further configured to assign a session-recording ID to the respective web-session.

In some cases, the session-recording ID is unique.

In accordance with a third aspect of the presently disclosed subject matter, there is provided a non-transitory computer readable storage medium having computer readable program code embodied therewith, the computer readable program code, executable by at least one processing circuitry of a computer to perform a web-session recording method comprising: providing, by a processing circuitry, instructions, executable as part of execution of a webpage executable by a web browser executing on a user device, the instructions designed to cause recording of a web-session, wherein executing the instructions as part of the webpage on the user device results in sending an execution indication, indicating of successful execution of the instructions, from the user device to the web-session recording system; upon the web-session recording system not receiving the execution indication after an attempt to execute the instructions on the user device, recording, by the processing circuitry, (a) requests sent from the user device associated with the web-session to the web-session recording system, and (b) responses sent from the web-session recording system to the user device associated with the web-session.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
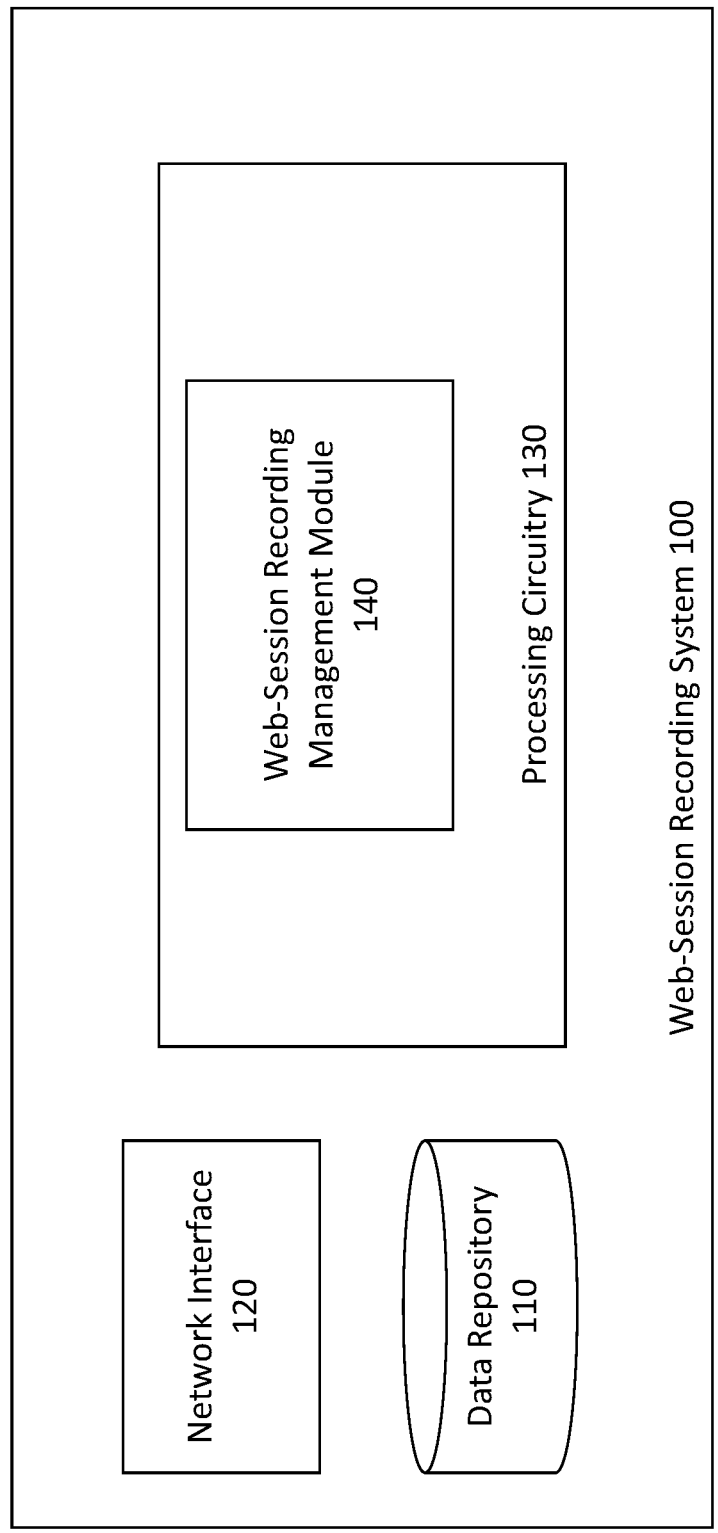
FIG. 1 is a block diagram schematically illustrating one example of a system for web-session recording, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "recording", "receiving", "assigning" or the like, include action and/or processes of a computer that manipulate and/or transform data into other data, said data represented as physical quantities, e.g. such as electronic quantities, and/or said data representing the physical objects. The terms "computer", "processor", "processing resource", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
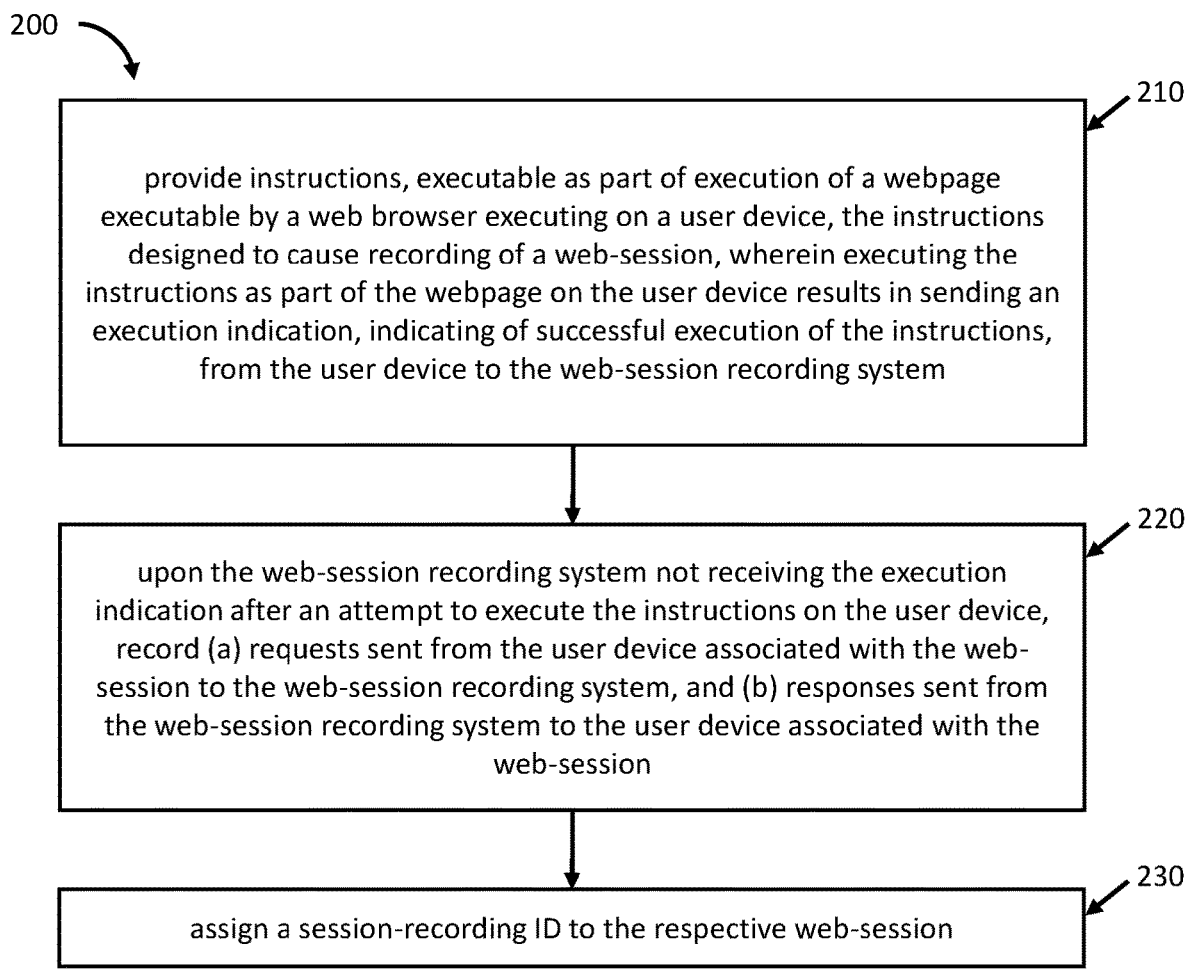
FIG. 2 is a flowchart illustrating one example of a sequence of operations carried out for web-session recording, in accordance with the presently disclosed subject matter.

In embodiments of the presently disclosed subject matter, fewer, more and/or different stages than those shown in FIG. 2 may be executed. In embodiments of the presently disclosed subject matter one or more stages illustrated in FIG. 2 may be executed in a different order and/or one or more groups of stages may be executed simultaneously. FIG. 1 illustrate a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a block diagram schematically illustrating one example of a system for web-session recording, in accordance with the presently disclosed subject matter.

According to certain examples of the presently disclosed subject matter, web-session recording system 100 can comprise a network interface 120 enabling connecting 30 web-session recording system 100 to a network and enabling it to send and receive data sent thereto through the network, including in some cases receiving and sending information to one or more user devices and/or one or more web-servers, for example receiving requests and sending responses as part of a web session from and to a user device. In some cases, the network interface 120 can be connected to a Local Area Network (LAN), to a Wide Area Network (WAN), or to the Internet. In some cases, the network interface 120 can connect to a wireless network.

Web-session recording system 100 can further comprise or be otherwise associated with a data repository 110 (e.g. a database, a storage system, a memory including Read Only Memory—ROM, Random Access Memory—RAM, or any other type of memory, etc.) configured to store data, including, inter alia, information defining web-sessions, user devices and web-servers, instructions designed to cause recording of a web-session, recordings of one or more web-sessions, browser cookies, etc. In some cases, data repository 110 can be further configured to enable retrieval and/or update and/or deletion of the data stored thereon. It is to be noted that in some cases, data repository 110 can be distributed. It is to be noted that in some cases, data repository 110 can be stored in on cloud-based storage.

It is to be noted that in some cases, web-session recording system 100 is a distributed system. In some cases, web-session recording system 100 can be hosted on a cloud computing platform.

Web-session recording system 100 further comprises processing circuitry 130. Processing circuitry 130 can be one or more processing circuitry units (e.g. central processing units), microprocessors, microcontrollers (e.g. microcontroller units (MCUs)) or any other computing devices or modules, including multiple and/or parallel and/or distributed processing circuitry units, which are adapted to independently or cooperatively process data for controlling relevant web-session recording system 100 resources and for enabling operations related to web-session recording system 100 resources.

The processing circuitry 130 comprises a web-session recording management module 140.

Web-session recording management module 140 can be configured to perform a web-session recording process, as further detailed herein, inter alia with reference to FIG. 2.

Turning to FIG. 2, there is shown a flowchart illustrating one example of a sequence of operations carried out for web-session recording, in accordance with the presently disclosed subject matter.

According to certain examples of the presently disclosed subject matter, web-session recording system 100 can be configured to perform a web-session recording process 200, e.g. utilizing the web-session recording management module 140.

For this purpose, web-session recording system 100 can be configured to provide instructions, executable as part of execution of a webpage executable by a web browser executing on a user device, the instructions designed to cause recording of a web-session, wherein executing the instructions as part of the webpage on the user device results in sending an execution indication, indicating of successful execution of the instructions, from the user device to the web-session recording system 100 (block 210).

The user device to which the instructions are provided (as part of a webpage) can be an endpoint computer (e.g. a desktop, laptop, etc.), a smart mobile device (e.g. a tablet, a mobile phone, etc.), a server, or any other computerized device that can run a web-browser. In some cases, there are one or more user devices that web-session recording system 100 can communicate with.

The webpage which comprises the instructions can be provided by a web-server. In some cases, the web server can be part of web-session recording system 100. In other cases, the web-server can be external to web-session recording system 100. In such cases, web-session recording system 100 provides the instructions to the web-server and the web-server embeds the instructions within the webpage's code and provides the webpage (with the attached instructions) to the one or more user devices. It is to be noted that in some cases the web-session recording system 100 can communicate with more than one web-server.

The execution indication that is generated upon successful execution of the instructions provided in block 210 can be, for example, a browser cookie or a session-recording Identification Number (ID), associated with a given web-session and identifying the given web-session.

The generated execution indication is attached by the user device to at least one request sent from the user device to the web-session recording system 100.

It is to be noted that the instructions provided by the web-session recording system 100 as part of the webpage can be JavaScript instructions, other scripting language instructions, or a combination thereof.

A non-limiting example of the above can be of a user device which is a smart mobile device. The smart mobile device is running a web browser to view a webpage as part of a session. The web-session recording system 100 provides instruction that are executable as part of execution of a webpage on the web browser. In this example, execution of the instructions is designed to cause recording of the web-session. In addition, in case of successful execution of the instructions, the smart mobile device sends an execution indication, in the form of a cookie attached to a response sent from the smart mobile device to the web-session recording system 100, indicating of successful execution of the instructions.

Upon the web-session recording system 100 not receiving the execution indication after an attempt to execute the instructions on the user device it is an indication that the recording is blocked, and accordingly, in order to still be able to record the session, the web-session recording system 100 records: (a) requests sent from the user device associated with the web-session to the web-session recording system 100, and (b) responses sent from the web-session recording system 100 to the user device associated with the web-session (block 220). In cases the web-session recording system 100 receives the execution indication, the recording is made from the side of the user device and the web-session recording system 100 does not have to record.

Recording can be blocked from various reasons, those reasons include, for example:

Script blocking software: In some cases, the attempt to execute the instructions is blocked by a script blocking software installed on the user device. The script blocking software can be installed as part of the web-browser (e.g. an add-on on the web-browser). The script blocking software can identify the web-browser attempting to execute the instructions and block them from executing. Thereby the recording of the web-session fails and an execution indication is not sent to the web-session recording system 100.

Security system blockage: In some cases, the attempt to execute the instructions is blocked by a security system removing the instructions from the webpage before the webpage is executed on the user device. The security system can be installed on one or more network elements (such as: firewalls, routers, switches, etc.) of a network that the user device is part thereof. The security system can identify the instructions within the webpage as it is on-route through the network and remove the instructions from the webpage before being provided to the user device. Thereby the recording of the web-session fails and an execution indication is not sent to the web-session recording system 100.

Bot blockage: In some cases, the attempt to execute the instructions is ignored by an agent selectively executing one or more parts of the webpage. The agent can be a web crawling bot that is executing the webpage as part of an automate analyzes of webpages. As part of the analyzes of the webpage, the web crawling bot can identify the instructions and block their execution. Thereby the recording of the web-session fails and an execution indication is not sent to the web-session recording system 100.

In those cases where user device recording is blocked, the recording of a given web-session are made by the web-session recording system 100 so that a user of the web-session recording system 100 will be able to replay the given web-session. For this purpose, the recordings can include one or more of the requests sent from the user device associated with the web-session to the web-session recording system 100 and one or more responses sent from the web-session recording system 100 to the user device. It is to be noted that in some cases the requests are made to a web-server and the responses are sent from the web server to the user device associated with the web-session.

Continuing the non-limiting example above, the attempt to execute the instructions is blocked by a script blocking software installed on the smart mobile device. This results in the web-session recording system 100 not receiving a cookie indicative of successful execution of the instructions from the smart mobile device. The web-session recording system 100 than records the requests sent from the smart mobile device associated with the web-session to the web-session recording system 100, and the responses sent from the web-session recording system 100 to the smart mobile device associated with the web-session.

In some cases, web-session recording system 100 is further configured to, when recording the requests sent from the user device associated with the web-session to the web-session recording system 100 and the responses sent from the web-session recording system 100 to the user device associated with the web-session, assign a session-recording ID to the respective web-session (block 230).

In some cases, the assigned session-recording ID is unique (e.g. a Globally Unique Identifier (GUID), a serial number, a randomly generated number, etc.).

Continuing the non-limiting example above, upon the web-session recording system 100 not receiving the execution indication from the smart mobile device, the web-session recording system 100 records the web-session and assigns a given GUID identifying the web-session. Web-session recording system 100 can use the given GUID to store and/or replay the recording of the web-session.

It is to be noted that, with reference to FIG. 2, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A web-session recording system comprising at least one processing circuitry configured to:
    provide instructions, executable as part of execution of a webpage executable by a web browser executing on a user device, the instructions designed to cause recording of a web-session, wherein executing the instructions as part of the webpage on the user device results in sending an execution indication, indicating of successful execution of the instructions, from the user device to the web-session recording system;
    upon the web-session recording system not receiving the execution indication after an attempt to execute the instructions on the user device, record (a) requests sent from the user device associated with the web-session to the web-session recording system, and (b) responses sent from the web-session recording system to the user device associated with the web-session.

2. The web-session recording system of claim 1, wherein the webpage is provided by a web-server.

3. The web-session recording system of claim 1, wherein the execution indication is attached to at least one of the requests.

4. The web-session recording system of claim 1, wherein the execution indication is a session-recording Identification Number (ID), associated with the web-session.

5. The web-session recording system of claim 1, wherein the attempt to execute the instructions is blocked by a script blocking software installed on the user device.

6. The web-session recording system of claim 1, wherein the attempt to execute the instructions is blocked by a security system removing the instructions from the webpage before the webpage is executed on the user device.

7. The web-session recording system of claim 1, wherein the attempt to execute the instructions is ignored by an agent selectively executing one or more parts of the webpage.

8. The web-session recording system of claim 1, wherein the instructions are JavaScript instructions.

9. The web-session recording system of claim 1, wherein the processing circuitry if further configured to assign a session-recording ID to the respective web-session.

10. The web-session recording system of claim 9, wherein the session-recording ID is unique.

11. A web-session recording method comprising:
    providing, by a processing circuitry, instructions, executable as part of execution of a webpage executable by a web browser executing on a user device, the instructions designed to cause recording of a web-session, wherein executing the instructions as part of the webpage on the user device results in sending an execution indication, indicating of successful execution of the instructions, from the user device to the web-session recording system;
    upon the web-session recording system not receiving the execution indication after an attempt to execute the instructions on the user device, recording, by the processing circuitry, (a) requests sent from the user device associated with the web-session to the web-session recording system, and (b) responses sent from the web-session recording system to the user device associated with the web-session.

12. The web-session recording method of claim 11, wherein the webpage is provided by a web-server.

13. The web-session recording method of claim 11, wherein the execution indication is attached to at least one of the requests.

14. The web-session recording method of claim 11, wherein the execution indication is a session-recording Identification Number (ID), associated with the web-session.

15. The web-session recording method of claim 11, wherein the attempt to execute the instructions is blocked by a script blocking software installed on the user device.

16. The web-session recording method of claim 11, wherein the attempt to execute the instructions is blocked by a security system removing the instructions from the webpage before the webpage is executed on the user device.

17. The web-session recording method of claim 11, wherein the attempt to execute the instructions is ignored by an agent selectively executing one or more parts of the webpage.

18. The web-session recording method of claim 11, wherein the instructions are JavaScript instructions.

19. The web-session recording method of claim 11, wherein the processing circuitry if further configured to assign a session-recording ID to the respective web-session.

20. The web-session recording method of claim 19, wherein the session-recording ID is unique.

21. A non-transitory computer readable storage medium having computer readable program code embodied therewith, the computer readable program code, executable by at least one processing circuitry of a computer to perform a web-session recording method comprising:

provide, by a processing circuitry, instructions, executable as part of execution of a webpage executable by a web browser executing on a user device, the instructions designed to cause recording of a web-session, wherein executing the instructions as part of the webpage on the user device results in sending an execution indication, indicating of successful execution of the instructions, from the user device to the web-session recording system;

upon the web-session recording system not receiving the execution indication after an attempt to execute the instructions on the user device, recording, by the processing circuitry, (a) requests sent from the user device associated with the web-session to the web-session recording system, and (b) responses sent from the web-session recording system to the user device associated with the web-session.

\* \* \* \* \*